United States Patent
Tigue et al.

(10) Patent No.: US 10,294,634 B2
(45) Date of Patent: May 21, 2019

(54) REAR ENTRY ELECTRIC DRIVE MOTOR MODULE

(71) Applicant: Caterpillar Inc., Peoria, IL (US)

(72) Inventors: Joseph D. Tigue, Peoria, IL (US);
Vance M. Buatte, Danvers, IL (US);
Jonathan M. Baumann, Hanna City, IL (US); Gregory Austin, East Peoria, IL (US); Timothy J. Schlack, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 769 days.

(21) Appl. No.: 14/503,439

(22) Filed: Oct. 1, 2014

(65) Prior Publication Data

US 2016/0097185 A1    Apr. 7, 2016

(51) Int. Cl.
| | | |
|---|---|---|
| *E02F 9/20* | (2006.01) | |
| *B62D 55/32* | (2006.01) | |
| *H02K 7/116* | (2006.01) | |
| *H02K 7/00* | (2006.01) | |

(52) U.S. Cl.
CPC .......... *E02F 9/2087* (2013.01); *B62D 55/32* (2013.01); *E02F 9/202* (2013.01); *E02F 9/207* (2013.01); *H02K 7/006* (2013.01); *H02K 7/116* (2013.01)

(58) Field of Classification Search
CPC .................................... E02F 9/2087
USPC ...................................... 180/206.3
See application file for complete search history.

(56) References Cited

U.S. PATENT DOCUMENTS

| | | | |
|---|---|---|---|
| 3,773,132 A | 11/1973 | Gawlik et al. | |
| 5,195,600 A | 3/1993 | Dorgan | |
| 6,892,837 B2 | 5/2005 | Simmons et al. | |
| 7,727,099 B2 | 6/2010 | Kasuya et al. | |
| 2002/0011374 A1* | 1/2002 | Brister ................. | B62D 21/183 180/291 |
| 2004/0069542 A1 | 4/2004 | Simmons et al. | |
| 2006/0180383 A1* | 8/2006 | Bataille ............... | B62D 21/183 180/311 |
| 2007/0289792 A1* | 12/2007 | Bataille ............... | B62D 21/183 180/89.17 |
| 2010/0093478 A1 | 4/2010 | Guttenberger et al. | |
| 2010/0304913 A1 | 12/2010 | Su | |
| 2012/0115668 A1 | 5/2012 | Thomas | |
| 2013/0045072 A1* | 2/2013 | Jensen .................. | E02F 9/2253 414/699 |

FOREIGN PATENT DOCUMENTS

| | | |
|---|---|---|
| JP | 2005199755 | 7/2005 |
| JP | 2012086630 | 5/2012 |
| WO | 2011148097 | 12/2011 |
| WO | 2013071128 | 5/2013 |

* cited by examiner

*Primary Examiner* — Joseph M Rocca
*Assistant Examiner* — Conan D Duda
(74) *Attorney, Agent, or Firm* — Daniel A. Staley; Oblon, McClelland, Maier & Neustadt

(57) ABSTRACT

A method for retrofitting a high drive track-type tractor with a rear entry electric drive motor module. The method includes inserting the rear entry electric drive motor module into a frame housing. The rear entry electric drive motor module includes an electric drive planetary gear assembly, and an electric motor. The method further includes attaching a reaction member to the rear entry electric drive motor module.

19 Claims, 5 Drawing Sheets

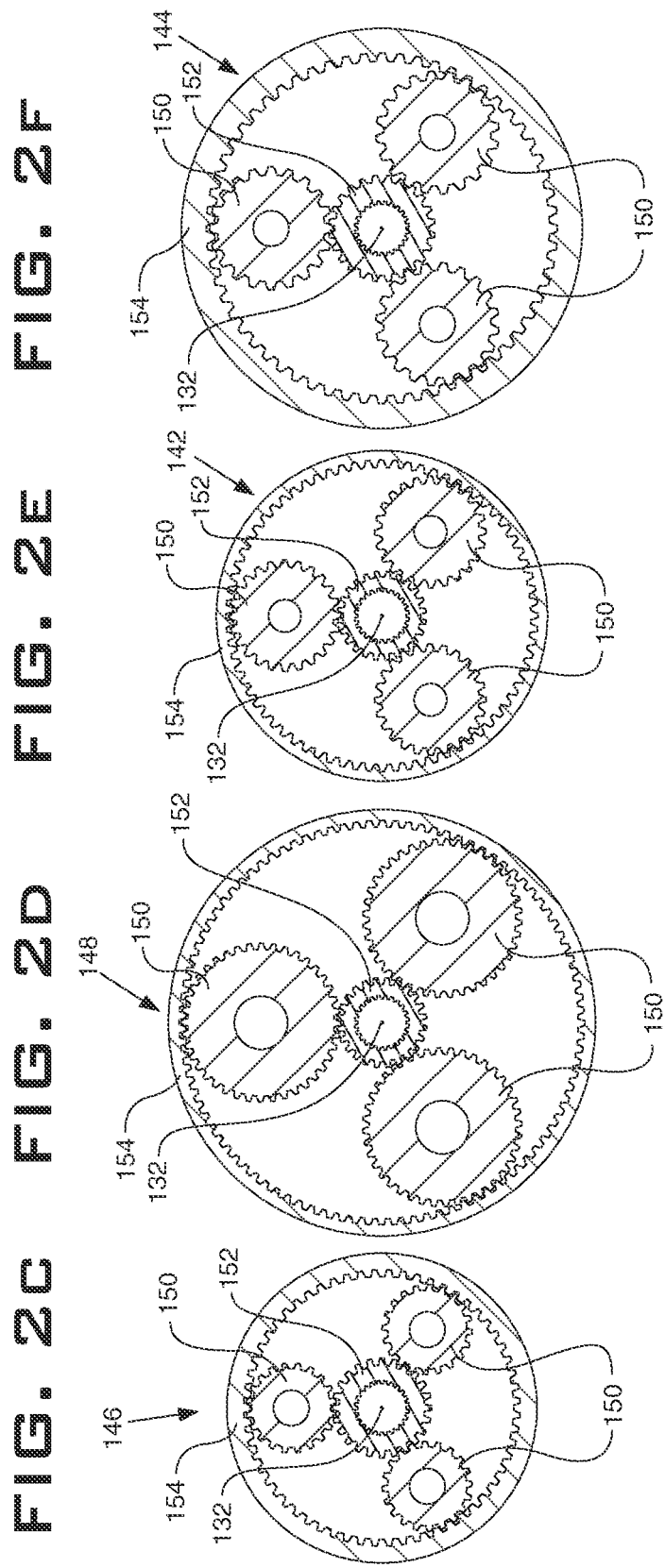

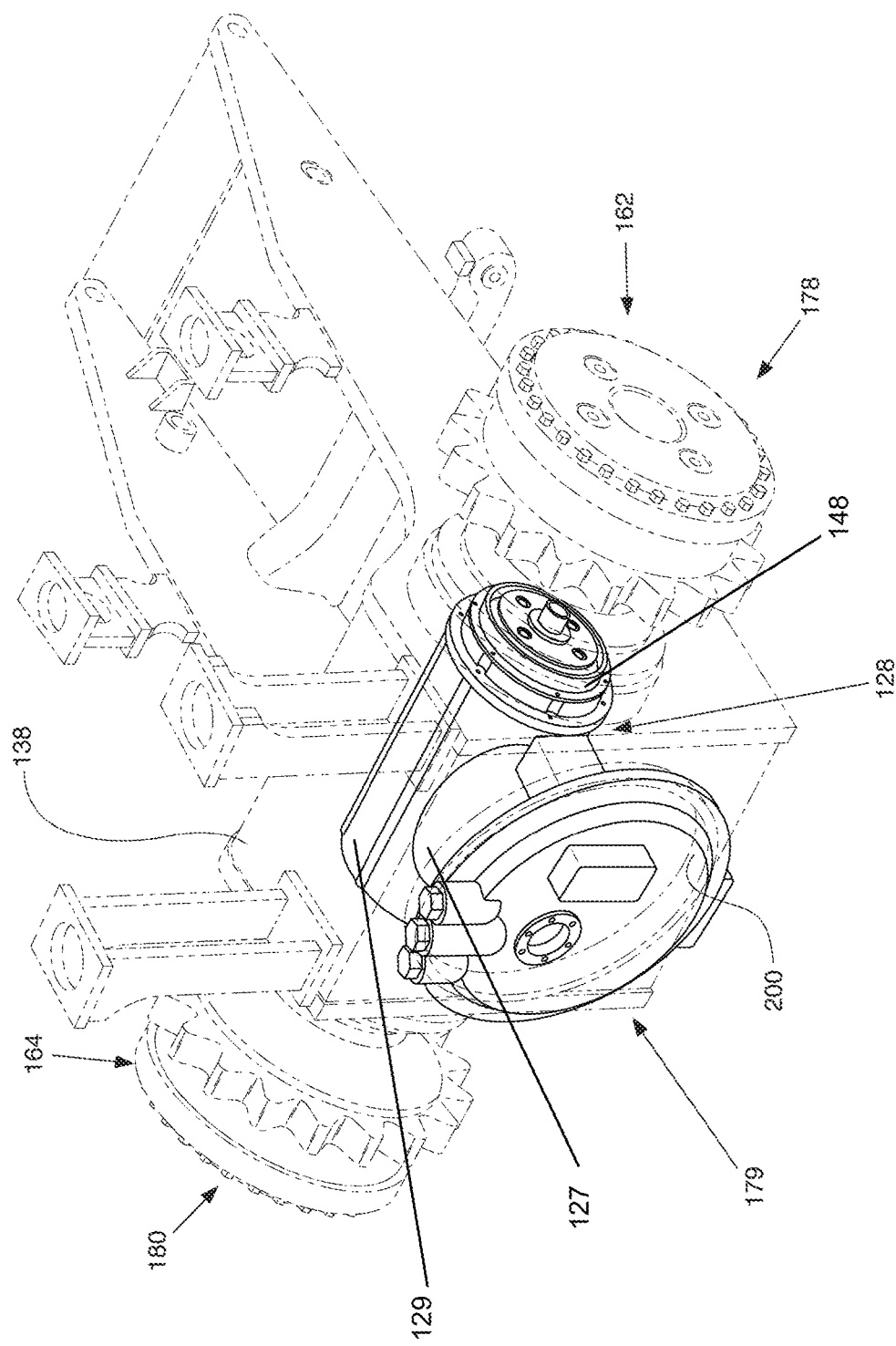

REAR ENTRY ELECTRIC DRIVE MOTOR MODULE

TECHNICAL FIELD

The present disclosure generally relates to an electric drive motor module, and more particularly relates to an electric drive motor module that can be inserted into a rear cavity of a track-type tractor frame housing.

BACKGROUND

Electric drive motors may be used in highway trucks, automobiles, or off-road work machines, such as, for example, track-type tractors. Electric drive motors generally supplement or provide driving power to help reduce emissions and increase fuel efficiency. In operation, electric drive motors typically generate an output torque which is transferred to ground engaging components on a machine—such as tracks on a track-type tractor.

Some machines, such as track-type tractors, generally include a differential steering arrangement that is disposed between the electric motor and the ground engaging devices on the machine. The differential steering arrangement is operable to change relative speeds of the ground engaging devices in order to steer the machine. The differential steering arrangement typically includes one or more planetary gear assemblies separate from the electric drive motor, as well as bevel or spur gears to transfer torque. However, requiring and using separate gear systems from the electric drive motor may decrease the efficiency of the electric drive motor, as well as the overall efficiency of the machine. Moreover, because conventional electric drive motors are usually connected to planetary gear sets during the installation process they require additional installation time and steps. In addition, conventional electric drive motors are not configured for rear entry into frame housings adding to assembly time. For example, U.S. Pat. No. 5,509,491 includes a motor operatively connected to a pair of planetary gear sets associated with respective tracks.

The foregoing background discussion is intended solely to aid the reader. It is not intended to limit the innovations described herein, nor to limit or expand the prior art discussed. Consequently, the foregoing discussion should not be taken to indicate that any particular element of a prior system is unsuitable for use with the innovations described herein, nor is it intended to indicate that any element is essential in implementing the innovations described herein. The implementations and application of the innovations described in the disclosure are defined by the appended claims.

SUMMARY

In one aspect, the present disclosure provides a method for retrofitting a high drive track-type tractor with a rear entry electric drive motor module. The method includes inserting the rear entry electric drive motor module into a frame housing. The rear entry electric drive motor module includes an electric drive planetary gear assembly, and an electric motor. The method further includes attaching a reaction member to the rear entry electric drive motor module.

In another aspect, the present disclosure provides an electric drive system including a rear entry electric drive motor module. The rear entry electric drive motor module includes an electric drive planetary gear assembly and an electric motor having a rotor shaft. The electric drive system further includes a first output member, a second output member, as well as a reaction member operatively associated with the rotor shaft.

In yet another aspect, the present disclosure provides a differential steering arrangement for a high drive track-type tractor including a high drive frame housing for housing a rear entry electric drive motor module. The rear entry electric drive motor module includes an electric drive planetary gear assembly and an electric motor having a hollow rotor shaft. The differential steering arrangement also includes a first output member, a second output member, as well as a reaction member operatively associated with the hollow rotor shaft.

Other features and aspects of this disclosure will be apparent from the following description and the accompanying drawings.

BRIEF DESCRIPTION OF THE DRAWINGS

FIG. 2C is a front view of a third planetary gear assembly;

FIG. 2D is a front view of an electric drive planetary gear assembly;

FIG. 2E is a front view of a first planetary gear assembly;

FIG. 2F is a front view of a second planetary gear assembly;

FIG. 3B is an isometric view of a high drive track-type tractor frame and rear entry electric drive motor module after assembly.

Figure 1:
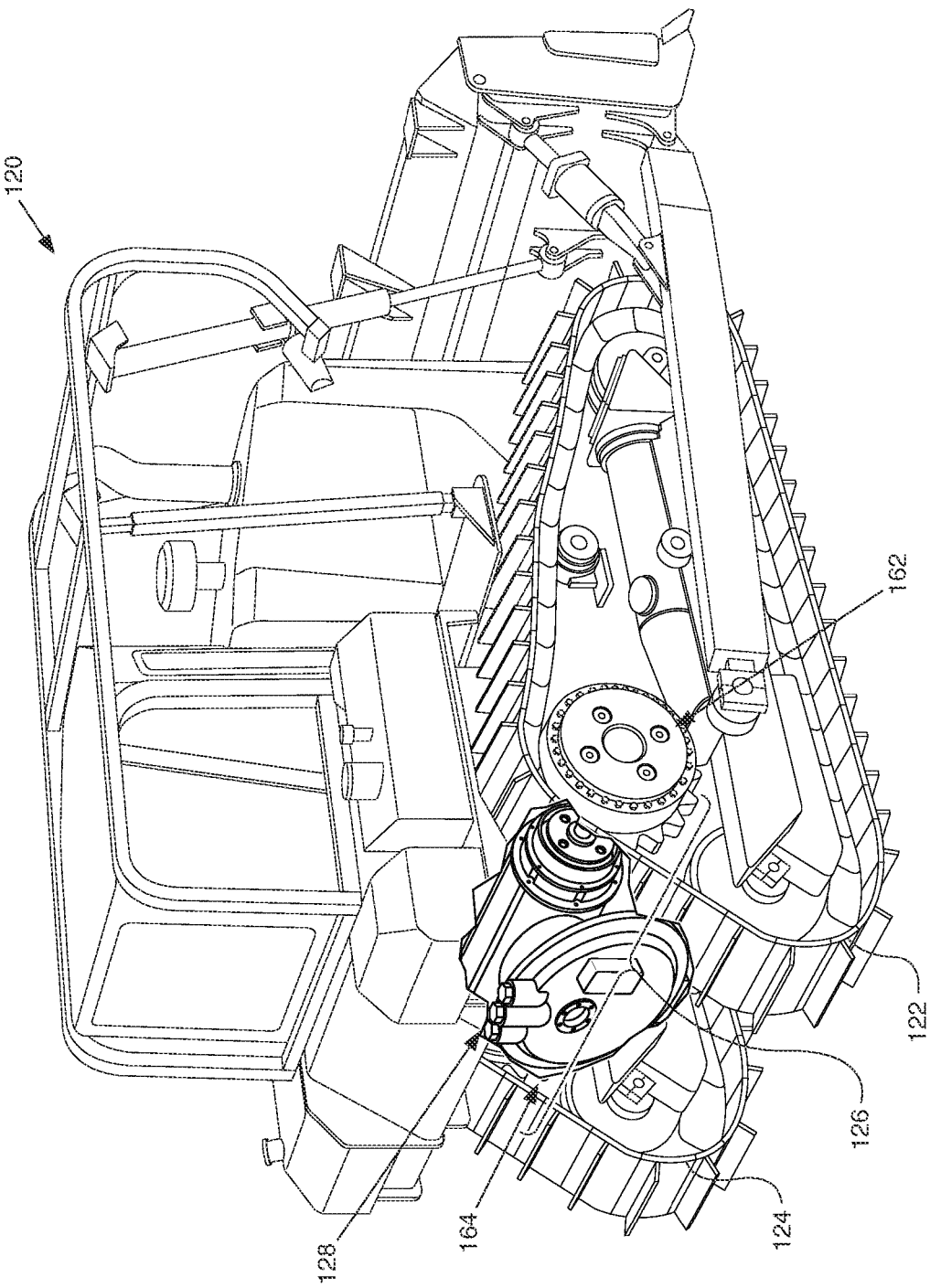
FIG. 1 is an isometric view of a high drive track-type tractor within which one or more embodiments of the present disclosure may be implemented.

While the disclosure is susceptible to various modifications and alternative forms, specifics have been shown by way of example in the drawings and will be described in detail below. It should be understood that the detailed description is not to limit aspects of the disclosure to the particular embodiments described. On the contrary, the disclosure covers all modifications, equivalents, and alternatives falling within the spirit and scope of the disclosure.

DETAILED DESCRIPTION

The present disclosure relates to a rear entry electric drive motor module that includes a reduction planetary gear assembly which can be inserted into a rear final drive cavity of a frame housing for a high drive track-type tractor. Wherever possible the same reference numbers will be used throughout the drawings to refer to the same or like parts. Moreover, references to various elements described herein are made collectively or individually when there may be more than one element of the same type. However, such references are merely exemplary in nature. Accordingly, it may be noted that any such reference to elements in the singular is also to be construed to relate to the plural and vice-versa without limiting the scope of the disclosure to the exact number or type of such elements unless set forth explicitly in the appended claims.

FIG. 1 shows an isometric view of a high drive track-type tractor 120 within which one or more embodiments of the present disclosure may be implemented. As shown, track-type tractor 120 includes a differential steering arrangement referred to as electric drive system 126 operatively associated with a first track 122 and a second track 124. Electric drive system 126 includes rear entry electric drive motor module 128 operatively associated with first final drive assembly 164 and second final drive assembly 162. Track-type tractor 120 may include an electrical power source (not shown) that may be, for example, a battery or an engine—such as an internal combustion engine with a generator.

Referring now to FIGS. 2A through 2F, rear entry electric drive motor module 128 includes electric motor 129 that exerts a torque to rotate rotor shaft 130. In some embodiments, rear entry electric drive motor module 128 includes a switched reluctance electric motor ("SRM")—shown as electric motor 129. In other embodiments, electric motor 129 is a direct current electric motor. In yet other embodiments, electric motor 129 is an alternating current motor. As electric motor 129 exerts torque, rotor shaft 130 is configured to rotate about an axis of rotation that aligns with a reference axis 132. The magnitude and direction of the exerted torque depends upon the magnitude and polarity of the electrical power that is applied to electric motor 129.

Electric drive system 126 also includes a first output member 134 and a second output member 136 that provides for differential steering. First output member 134 being operatively connected to first track 122. Second output member 136 being operatively connected to second track 124. Electric drive system 126 may further include a first sprocket 166 and a second sprocket 168. First sprocket 166 may be connected to first output member 134 and configured to engage first track 122. Second sprocket 168 may be connected to second output member 136 and configured to engage second track 124. First sprocket 166 and second sprocket 168 drive the first track 122 and the second track 124 (respectively) in response to rotation of first output member 134 and second output member 136.

A first brake 158 may be configured to engage first output member 134 and a second brake 160 may be configured to engage second output member 136. First brake 158 and second brake 160 may be operated to reduce the rotational speed of first output member 134 and second output member 136, respectively. Accordingly, first brake 158 and second brake 160 may be operated to reduce the overall speed of track-type tractor 120. First brake 158 and second brake 160 may also engage first output member 134 and second output member 136 to help prevent track-type tractor 120 from moving.

Figure 2A:
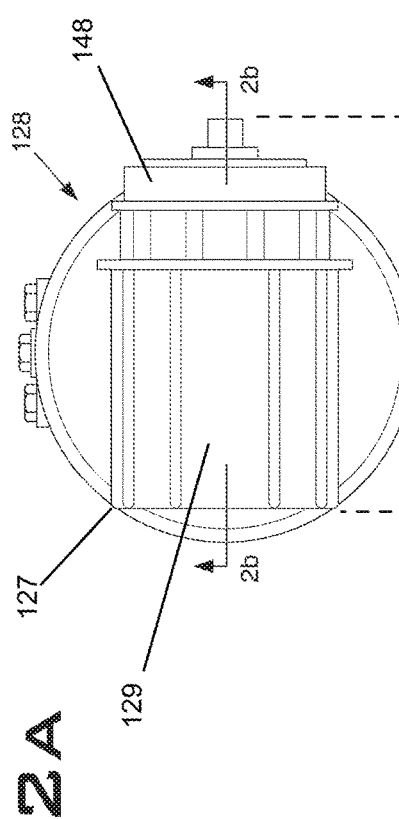
FIG. 2A is an isometric view of a rear entry electric drive motor module in isolation.
Figure 2B:
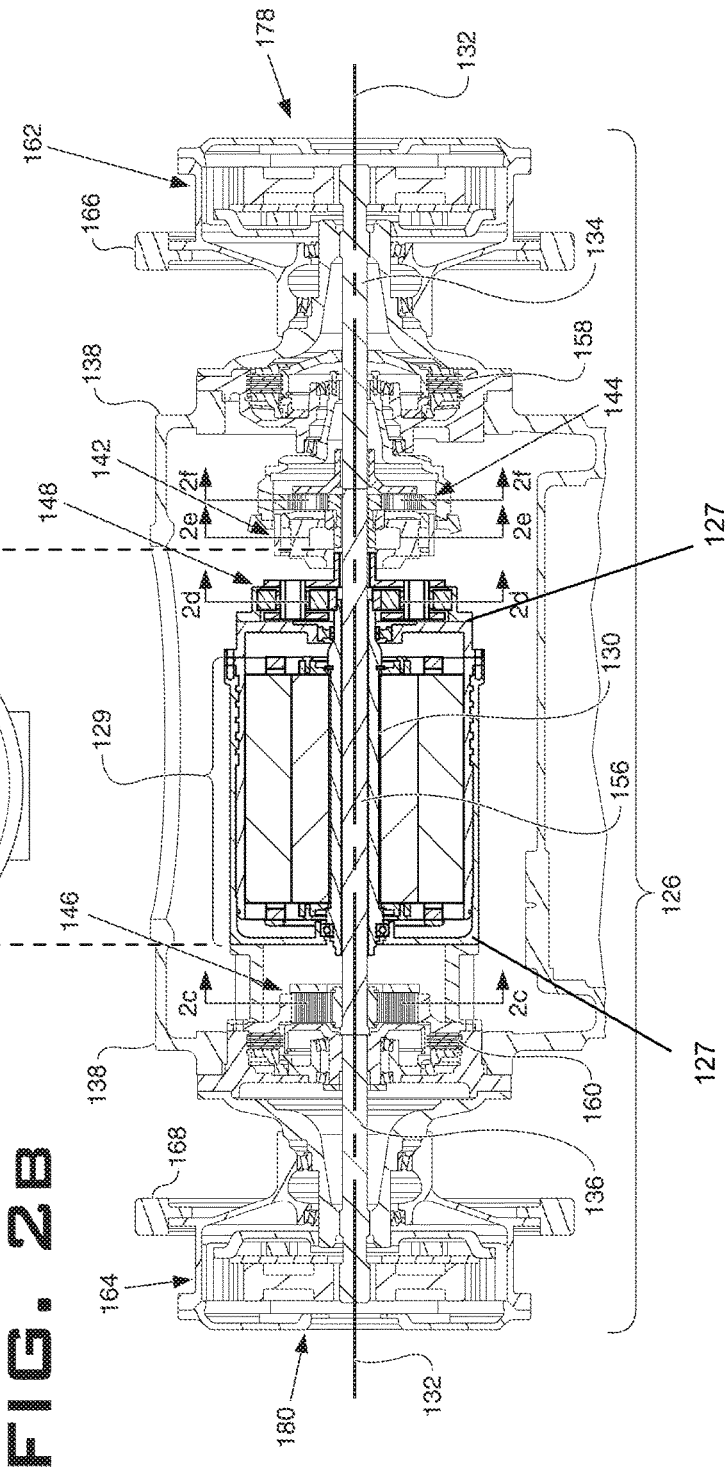
FIG. 2B is a cross-sectional view of a rear entry electric drive motor module attached to final drive assemblies.

As shown in FIGS. 2A and 2B, first planetary gear assembly 142, second planetary gear assembly 144, and third planetary gear assembly 146 are all part of the differential steering arrangement. A differential steering motor (not shown) drives second planetary gear assembly 144 to create differential speed for steering by speeding up or slowing down second planetary gear assembly 144 relative to first planetary gear assembly 142. As would be understood by a person having ordinary skill in the art, the differential steering motor may be electric or hydraulic. Rear entry electric drive motor module 128 includes reduction planetary gear assembly 148 also referred to as electric drive planetary gear assembly 148. As shown in FIGS. 2A, 2B, 3A, and 3B, the rear entry electric drive motor module 128 can be a single displaceable unit defined by a housing assembly 127. The rotation of the third planetary gear assembly 146 and electric drive planetary gear assembly 148 align with reference axis 132 and rotor shaft 130. As would be understood by a person having ordinary skill in the art, third planetary gear assembly 146 may include sun gear 152, planet gears 150, and ring gear 154 (shown in FIG. 2C), or a similar configuration. Likewise, as would be understood by a person having ordinary skill in the art, electric drive planetary gear assembly 148 may include sun gear 152, planet gears 150, and ring gear 154 (shown in FIG. 2D), or a similar configuration. Each sun gear 152 is configured to rotate about an axis and to mesh with the respective planet gears 150. Planet gears 150 orbit about sun gear 152 and mesh with the respective ring gear 154. Each ring gear 154 may be configured to rotate about the axis of rotation of sun gear 152 or each ring gear 154 may be fixed relative to frame housing 138 to prevent ring gear 154 from rotating.

Separate from the rear entry electric drive motor module 128, electric drive system 126 includes a first planetary gear assembly 142 and a second planetary gear assembly 144. The rotation of first planetary gear assembly 142 and second planetary gear assembly 144 align with reference axis 132 and rotor shaft 130. As would be understood by a person having ordinary skill in the art, first planetary gear assembly 142 and second planetary gear assembly 144 may include sun gear 152, planet gears 150, and ring gear 154 (shown in FIGS. 2E and 2F), or a similar configuration.

As shown in FIGS. 2B through 2F, the rotational axis of each sun gear 152 and each planet gear 150 for first planetary gear assembly 142, second planetary gear assembly 144, third planetary gear assembly 146, and electric drive planetary gear assembly 148—substantially align with the reference axis 132, and with the rotational axis of rotor shaft 130 of rear entry electric drive motor module 128. As would be understood by a person having ordinary skill in the art, planetary gear assemblies receive input rotation at a first speed and generate a corresponding output rotation at a second speed. The change in rotational speed between the input and the output depends upon the number of teeth in sun gears 152, planet gears 150, and ring gears 154. The change in rotational speed also depends upon the gears that are used to receive the input rotation and the gear that is selected to provide the output rotation. The input rotation may be delivered to a planetary gear assembly through one or more of sun gears 152, planet gears 150, and ring gears 154. If only one sun gear 152, planet gear 150, and ring gear 154 receives the input rotation then one of the sun gears 152, planet gears 150, and ring gears 154 may be fixed to frame housing 138. The output rotation will be generated in the remaining sun gears 152, planet gears 150, and ring gears 154.

In combination with first planetary gear assembly 142 and second planetary gear assembly 144, the rear entry electric drive motor module 128 provides for differential steering of high drive track-type tractor 120. A reaction member 156 operatively connects first planetary gear assembly 142 to second planetary gear assembly 144, first output member 134, second output member 136, third planetary gear assembly 146, and electric drive planetary gear assembly 148. Rotor shaft 130 may be hollow and include an opening through which reaction member 156 extends such that rotor shaft 130 and reaction member 156 substantially align with reference axis 132. Such a configuration allows the rotor shaft 130 to operatively engage with first output member 134 and second output member 136. A person having ordinary skill in the art would recognize that first planetary gear assembly 142, second planetary gear assembly 144, third planetary gear assembly 146, and electric drive planetary gear assembly 148 may have a variety of gear reduction ratios, depending upon the expected operating conditions of track-type tractor 120.

A second final drive assembly 162 may be operatively associated with first output member 134 and first sprocket 166. A first final drive assembly 164 may be operatively associated with second output member 136 and second sprocket 168. As would be understood by a person having ordinary skill in the art, second final drive assembly 162 and first final drive assembly 164 may be planetary gear assemblies that include sun gears, planet gears, and ring gears. The rotational axis of second final drive assembly 162 and first final drive assembly 164 may substantially align with reference axis 132. Second final drive assembly 162 and first final drive assembly 164 may provide a gear reduction between the first output member 134 and second output member 136, as well as first sprocket 166 and second sprocket 168. For example, the gear reduction of second final drive assembly 162 and first final drive assembly 164 may be 5:1. However, a person having ordinary skill in the art would recognize that second final drive assembly 162 and first final drive assembly 164 may provide any gear reduction to meet the operational requirements of track-type tractor 120.

Electric drive planetary gear assembly 148 may be configured to reduce the rotational speed of rotor shaft 130 of rear entry electric drive motor module 128. The output of electric drive planetary gear assembly 148 may be used as an input to the differential steering arrangement. In this manner, the torque generated by rear entry electric drive motor module 128 may be transferred to the differential steering arrangement at a reduced rotational speed. Rotor shaft 130 of rear entry electric drive motor module 128 may be operatively associated with sun gear 152 of electric drive planetary gear assembly 148. Ring gear 154 of electric drive planetary gear assembly 148 may be fixed to a frame housing 138. Planet gear 150 of Electric drive planetary gear assembly 148 may be operatively associated with planet gears 150 of first planetary gear assembly 142. A rotation of rotor shaft 130 causes a corresponding rotation of sun gear 152. The rotation of sun gear 152 causes planet gear 150 to orbit about sun gear 152 at a reduced rotational speed. The amount of reduction in the rotational speed depends upon the number of teeth in sun gear 152, planet gears 150, and ring gear 154 of electric drive planetary gear assembly 148. The reduced rotational speed of planet gear 150 of electric drive planetary gear assembly 148 is transferred to the differential steering arrangement as an input rotation to planet gears 150 of first planetary gear assembly 142. First planetary gear assembly 142 drives reaction member 156. Reaction member 156 drives third planetary gear assembly 146 which drives second output member 136 that drives first final drive assembly 164 that drives second sprocket 168.

As mentioned, a differential steering motor (not shown) drives second planetary gear assembly 144 to create differential speed for steering by speeding up or slowing down second planetary gear assembly 144 relative to first planetary gear assembly 142. First planetary gear assembly 142 may be operatively associated with third planetary gear assembly 146. Ring gear 154 of first planetary gear assembly 142 may be operatively associated with planet gear 150 of second planetary gear assembly 144. Reaction member 156 is operatively associated with sun gear 152 of first planetary gear assembly 142 and sun gear 152 of third planetary gear assembly 146. First planetary gear assembly 142 provides an input rotation to third planetary gear assembly 146. A rotation of planet gear 150 of first planetary gear assembly 142 causes a corresponding rotation of the associated sun gear 152 and of reaction member 156. The rotation of reaction member 156 provides an input rotation to sun gear 152 of third planetary gear assembly 146.

The rotation of sun gears 152 of second planetary gear assembly 144 and third planetary gear assembly 146—cause planet gears 150 to orbit about sun gears 152. Third planetary gear assembly 146, electric drive planetary gear assembly 148, first planetary gear assembly 142, and second planetary gear assembly 144—may be configured so that when ring gears 154 of second planetary gear assembly 144 and third planetary gear assembly 146 are held stationary, planet gears 150 will orbit about sun gears 152 at the same rotational speed. The rotational speed of planet gears 150 of second planetary gear assembly 144 is transferred to first output member 134 to help drive first track 122 at a corresponding speed. The rotational speed of planet gears 150 of third planetary gear assembly 146 is transferred to second output member 136 to help drive second track 124 at a corresponding speed.

The rotational speed of planet gears 150 of second planetary gear assembly 144 and third planetary gear assembly 146 may be altered by providing an additional input to one or both of the ring gears 154 in second planetary gear assembly 144 and third planetary gear assembly 146. Ring gear 154 of second planetary gear assembly 144 may be configured to rotate about reference axis 132, whereas ring gear 154 of third planetary gear assembly 146 may be fixed to frame housing 138. Alternatively, ring gear 154 of third planetary gear assembly 146 may be configured to rotate about reference axis 132. Likewise, ring gear 154 of second planetary gear assembly 144 may be fixed to frame housing 138 or both ring gears 154 may be configured to rotate about reference axis 132.

Figure 3A:
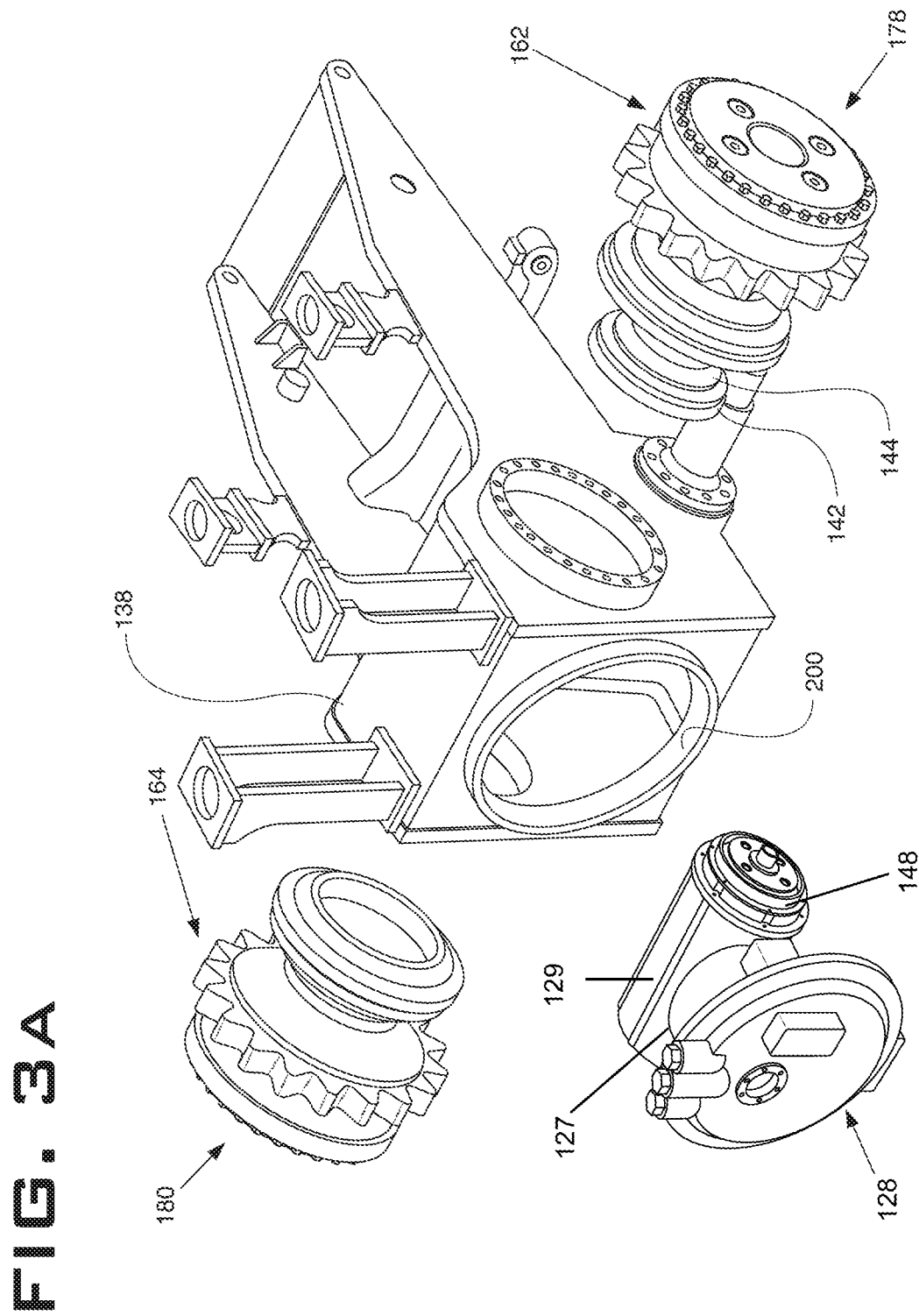
FIG. 3A is an isometric view of a high drive track-type tractor frame and rear entry electric drive motor module prior to assembly.

FIGS. 3A and 3B illustrate an exemplary configuration of rear entry electric drive motor module 128 within a frame housing 138. First planetary gear assembly 142, second planetary gear assembly 144, and second final drive assembly 162 may be installed in frame housing 138 from a first side 178. First final drive assembly 164 and third planetary gear assembly 146 may be installed from second side 180, and rear entry electric drive motor module 128 including electric drive planetary gear assembly 148 and electric motor 129 may be installed from rear entry 179. A method for retrofitting a high drive track-type tractor 120 with rear entry electric drive motor module 128 may include inserting the housing assembly 127 that defines the rear entry electric drive motor module 128 into frame housing 138 through rear cavity 200 of the frame housing 138. As discussed above, the rear entry electric drive motor module 128 may include electric drive planetary gear assembly 148, and electric motor 129. The method may also include connecting the first final drive assembly 164 and second final drive assembly 162 to the rear entry electric drive motor module 128. The method may yet further include attaching the reaction member 156 to the rear entry electric drive motor module 128 in the manner described above. Similarly, the method may include attaching the other components in the manner described above.

Although the present disclosure discloses that the rear entry electric drive motor module 128 is part of high drive track-type tractor 120, a person having ordinary skill in the art will appreciate that rear entry electric drive motor module 128 may be beneficially implemented with other similar machines. Therefore, various combinations of the parts disclosed herein may be contemplated and such combinations can be implemented without deviating from the spirit of the present disclosure.

INDUSTRIAL APPLICABILITY

The rear entry electric drive motor module 128 of the present disclosure has applicability for implementation and use in industrial settings such as mining, agriculture, and construction. The technology described may be provided for high drive track-type tractors 120, but also may be applied to other machines—more particularly to other tracked machines having differential steering. Track-type tractor 120 may include an internal combustion engine or an electrical storage device that supplies electrical power to rear entry electric drive motor module 128. Electronic controls may govern the generation and/or supply of electrical power to rear entry electric drive motor module 128 in response to instructions from an operator. In response to electric power, electric motor 129 exerts a torque on rotor shaft 130.

The magnitude and polarity of the electrical power applied to the rear entry electric drive motor module 128 determines the direction and magnitude of the torque exerted on rotor shaft 130. The torque exerted by electric motor 129 causes rotor shaft 130 to rotate. The rotational speed of rotor shaft 130 may be altered by electric drive planetary gear assembly 148 and third planetary gear assembly 146. The rotational speed of rotor shaft 130 also may be altered by first planetary gear assembly 142 and second planetary gear assembly 144 located outside of rear entry electric drive motor module 128. The coordination between third planetary gear assembly 146, electric drive planetary gear assembly 148, first planetary gear assembly 142, second planetary gear assembly 144, rotor shaft 130, and reaction member 156—provides for differential steering within electric drive system 126. Rotor shaft 130 splines into electric drive gear assembly 148. Electric drive gear assembly 148 splines into first planetary gear assembly 142. First planetary gear assembly 142 drives reaction member 156. Reaction member 156 drives third planetary gear assembly 146 which drives second output member 136 that drives first final drive assembly 164 that drives second sprocket 168.

An operator may steer track-type tractor 120 by controlling the rotational speed of first final drive assembly 164 and second final drive assembly 162 operatively associated with the planetary gear assemblies described above. During straight driving, first planetary gear assembly 142 operates at the same speed as second planetary gear assembly 144. Second planetary gear assembly 144 drives into first output member 134 that drives second final drive assembly 162 that drives first sprocket 166. To steer track-type tractor 120, second planetary gear assembly 144 is driven by differential steering motor (not shown) which makes first output member 134 spin faster or slower than second output member 136.

The turning rate of track-type tractor 120 is influenced by the magnitude of the difference in relative speeds of first track 122 and second track 124. As discussed above, the present invention provides an electric drive system 126 in which the rotational axis of an electric motor 129 substantially aligns with the rotational axis of third planetary gear assembly 146, electric drive planetary gear assembly 148, first planetary gear assembly 142, and second planetary gear assembly 144. By aligning the rotational axes, the output torque of electric motor 129 may be delivered directly to third planetary gear assembly 146, electric drive planetary gear assembly 148, first planetary gear assembly 142, second planetary gear assembly 144 without the need for a bevel or spur gear transfer arrangement. Such a configuration provides for a reduction in gear losses associated with transferring torque from the electric motor 129 to first track 122 and second track 124. Accordingly, the electric drive system 126, including rear entry electric drive motor module 128, increases the efficiency of track-type tractor 120. Configuring electric drive system 126 in the manner described herein, further reduces the overall size and weight of electric drive system 126 to help reduce emissions and increase fuel efficiency by reducing overall size and weight. The rear entry electric drive motor module 128 further increases manufacturing capabilities by including at least one planetary gear within the rear entry electric drive motor module 128 as defined by the housing assembly 127 that is separable as a single displaceable unit from the frame housing 138, such as shown in FIG. 3A. Moreover, adding to the manufacturing capabilities, the rear entry electric drive motor module 128 is configured to insert, as a single displaceable unit defined by the housing assembly 127, into the rear cavity 200 of frame housing 138.

While aspects of the present disclosure have been particularly shown and described with reference to the embodiments above, it will be understood by those skilled in the art that various additional embodiments may be contemplated by modification of the disclosed machines, systems and methods without departing from the spirit and scope of what is disclosed. Such embodiments should be understood to fall within the scope of the present invention as determined based upon the claims below and any equivalents thereof.

What is claimed is:

1. An electric drive system, comprising:
    a rear entry electric drive motor module, the rear entry electric drive motor module being a single displaceable unit defined by a housing assembly and that includes:
        an electric drive planetary gear assembly, and
        an electric motor having a rotor shaft, the electric drive planetary gear assembly being integrated with the electric motor;
    a first output member;
    a second output member; and
    a reaction member operatively associated with the rotor shaft,
    wherein the housing assembly of the rear entry electric drive motor module is different and separable from a frame housing associated with the electric drive system.

2. The electric drive system of claim 1, wherein the rear entry electric drive motor module is operatively associated with a first planetary gear assembly, a second planetary gear assembly, and a third planetary gear assembly.

3. The electric drive system of claim 2, wherein the reaction member drives the third planetary gear assembly.

4. The electric drive system of claim 1, wherein the electric motor is an alternating current electric motor.

5. The electric drive system of claim 1, wherein the electric motor is a direct current electric motor.

6. The electric drive system of claim 1, wherein the rotor shaft splines into the electric drive planetary gear assembly.

7. The electric drive system of claim 6, wherein the rotor shaft of the electric motor is hollow and the reaction member extends through the hollow rotor shaft.

8. A differential steering arrangement for a tractor, comprising:
    a frame housing having a rear opening leading to a cavity;
    a rear entry electric drive motor module, the rear entry electric drive motor module being a single displaceable unit defined by a housing assembly, different from the frame housing, and that includes:
        an electric drive planetary gear assembly, an electric motor having a hollow rotor shaft, the electric drive planetary gear assembly being integrated with the electric motor;
a first output member;
a second output member; and
a reaction member operatively associated with the hollow rotor shaft,
wherein the housing assembly of the rear entry electric drive motor module is separable from the frame housing via the rear opening, and
wherein the housing assembly of the rear entry electric drive motor module is arranged at least partially in the rear opening of the frame housing.

9. The differential steering arrangement of claim 8, wherein the reaction member drive a third planetary gear assembly.

10. The differential steering arrangement of claim 8, wherein the electric motor is an alternating current electric motor.

11. The differential steering arrangement of claim 8, wherein the electric motor is a direct current electric motor.

12. The differential steering arrangement of claim 8, wherein the rotor shaft splines into the electric drive gear assembly.

13. The differential steering arrangement of claim 12, wherein the reaction member extends through the hollow rotor shaft.

14. A vehicle, comprising:
a frame housing having rear cavity access through a rear entry in a rear-facing side of the frame housing;
a first ground engaging device;
a second ground engaging device;
a first output member connected to the first ground engaging device;
a second output member connected to the second ground engaging device; and
an electric drive system, comprising:
an electric drive motor module, the electric drive motor module being a single displaceable unit defined by a housing assembly and configured for installation in the vehicle through the rear entry of the frame housing, and the electric drive motor module including:
an electric drive planetary gear assembly, and
an electric motor having a rotor shaft, the electric drive planetary gear assembly being integrated with the electric motor, and
a reaction member operatively associated with the rotor shaft,
wherein the electric drive motor module is operatively associated with a first planetary gear assembly, a second planetary gear assembly, and a third planetary gear assembly, and
wherein the housing assembly defining the electric drive motor module is removable from the frame housing without removing any of the first, second, or third planetary gear assemblies.

15. The electric drive system of claim 14, wherein the reaction member drives the third planetary gear assembly.

16. The electric drive system of claim 14, wherein the electric motor is an alternating current electric motor.

17. The electric drive system of claim 14, wherein the electric motor is a direct current electric motor.

18. The electric drive system of claim 14, wherein the rotor shaft splines into the electric drive planetary gear assembly.

19. The electric drive system of claim 18, wherein the rotor shaft of the electric motor is hollow and the reaction member extends through the hollow rotor shaft.

* * * * *